(12) United States Patent
Siegenthaler et al.

(10) Patent No.: US 9,034,945 B2
(45) Date of Patent: *May 19, 2015

(54) ITEM PRODUCED VIA THERMOFORMING

(75) Inventors: Kai Oliver Siegenthaler, Mannheim (DE); Jörg Auffermann, Freinsheim (DE); Martin Bussmann, Beindersheim (DE); Kian Molawi, Mannheim (DE)

(73) Assignee: BASF SE, Ludwigshafen (DE)

( * ) Notice: Subject to any disclaimer, the term of this patent is extended or adjusted under 35 U.S.C. 154(b) by 165 days.

This patent is subject to a terminal disclaimer.

(21) Appl. No.: 13/535,986

(22) Filed: Jun. 28, 2012

(65) Prior Publication Data

US 2013/0005895 A1    Jan. 3, 2013

Related U.S. Application Data

(60) Provisional application No. 61/502,891, filed on Jun. 30, 2011.

(51) Int. Cl.
| | | |
|---|---|---|
| *C08K 3/28* | (2006.01) | |
| *C08K 3/30* | (2006.01) | |
| *C08K 3/32* | (2006.01) | |
| *C08K 3/34* | (2006.01) | |
| *C08L 67/02* | (2006.01) | |
| *C08L 67/04* | (2006.01) | |
| *C08K 3/22* | (2006.01) | |

(52) U.S. Cl.
CPC .............. *C08L 67/02* (2013.01); *C08K 3/346* (2013.01); *C08L 67/04* (2013.01); *C08K 2003/2206* (2013.01)

(58) Field of Classification Search
CPC ......... C08L 67/02; C08L 67/04; C08K 3/346; C08K 2003/2206
USPC .................................. 523/124; 524/425, 451
See application file for complete search history.

(56) References Cited

U.S. PATENT DOCUMENTS

| | | |
|---|---|---|
| 6,018,004 A | 1/2000 | Warzelhan et al. |
| 6,573,340 B1 | 6/2003 | Khemani et al. |
| 2001/0003761 A1* | 6/2001 | Ishibashi et al. ............... 524/425 |
| 2011/0178196 A1* | 7/2011 | Steinke et al. ................. 521/135 |
| 2011/0313075 A1 | 12/2011 | Siegenthaler et al. |
| 2012/0288650 A1 | 11/2012 | Freese et al. |
| 2013/0004759 A1 | 1/2013 | Siegenthaler et al. |

FOREIGN PATENT DOCUMENTS

| | | |
|---|---|---|
| DE | 19857067 A1 | 6/1999 |
| EP | 488617 A2 | 6/1992 |
| WO | WO-9615173 A1 | 5/1996 |
| WO | WO-2005063883 A1 | 7/2005 |
| WO | PCT/EP2008/006714 | 2/2009 |
| WO | WO-2009/024294 A1 | 2/2009 |
| WO | WO-2010034711 A1 | 4/2010 |

OTHER PUBLICATIONS

European Search Report for EP 11 17 2188.

* cited by examiner

*Primary Examiner* — Kriellion Sanders
(74) *Attorney, Agent, or Firm* — Drinker Biddle & Reath LLP

(57) ABSTRACT

The present invention relates to an item produced via thermoforming and comprising:
i) a biodegradable polyester comprising:
a) succinic acid;
b) optionally one or more $C_6$-$C_{20}$ dicarboxylic acids;
   e) 1,3-propanediol or 1,4-butanediol;
f) a chain extender or branching agent;
ii) polylactic acid;
iii) at least one mineral filler;
The invention further relates to processes for producing the abovementioned items.

5 Claims, No Drawings

ITEM PRODUCED VIA THERMOFORMING

CROSS-REFERENCE TO RELATED APPLICATIONS

This application claims benefit (under 35 USC 119(e)) of U.S. Provisional Application 61/502,891, filed Jun. 30, 2011, which is incorporated by reference.

The present invention relates to an item produced via thermoforming and comprising:
i) from 50 to 85% by weight, based on the total weight of components i to ii, of a biodegradable polyester with MVR (190° C., 2.16 kg) of from 1 to 15 cm³/10 min and comprising:
  a) from 90 to 99.5 mol %, based on components a to b, of succinic acid;
  b) from 0 to 10 mol %, based on components a to b, of one or more $C_6$-$C_{20}$ dicarboxylic acids;
  c) from 98 to 102 mol %, based on components a to b, of 1,3-propanediol or 1,4-butanediol;
  d) from 0.05 to 1% by weight, based on components a to c, of a chain extender or branching agent;
ii) from 15 to 50% by weight, based on the total weight of components i to ii, of polylactic acid;
iii) from 10 to 50% by weight, based on the total weight of components i to iv, of at least one mineral filler;
iv) from 0 to 2% by weight, based on the total weight of components i to iv, of a nutrient salt mixture comprising at least two components selected from the group consisting of: nitrogen-containing cation or anion, sulfur-containing anion, and phosphorus-containing anion and cation selected from the group consisting of $K^+$, $Na^+$, $Ca^{2+}$, $Mg^{2+}$, and $Fe^{2/3+}$.

The invention further relates to processes for producing the abovementioned items.

Filled biodegradable polymer mixtures which comprise a flexible polymer such as an aliphatic-aromatic polyester (PBAT), and a rigid polymer, such as polylactic acid (PLA), are known from U.S. Pat. No. 6,573,340 and WO 2005/063883. However, items produced therefrom via thermoforming are not always entirely satisfactory in terms of heat distortion resistance, stress-strain performance (modulus of elasticity), and biodegradability.

An objective of the present invention was therefore to provide items produced via thermoforming, which do not have the abovementioned disadvantages. A particular objective was to provide a sufficiently rigid plastic with heat resistance sufficient for applications in the hot food and drinks sector. Biodegradability rate should moreover be sufficiently high for certification to ISO 17088 and/or EN 13432 and/or ASTM D6400 for an item with wall thicknesses of from 50 μm to 2 mm.

Surprisingly, an item produced via thermoforming or injection molding and comprising:
i) from 50 to 85% by weight, based on the total weight of components i to ii, of a biodegradable polyester with MVR (190° C., 2.16 kg) of from 1 to 15 cm³/10 min and comprising:
  a) from 90 to 100 mol %, preferably from 90 to 99.5 mol %, based on components a to b, of succinic acid;
  b) from 0 to 10 mol %, preferably from 0.5 to 10 mol %, based on components a to b, of one or more $C_6$-$C_{20}$ dicarboxylic acids;
  c) from 98 to 102 mol %, based on components a to b, of 1,3-propanediol or 1,4-butanediol;
  d) from 0.05 to 1% by weight, based on components a to c, of a chain extender or branching agent;
ii) from 15 to 50% by weight, based on the total weight of components i to ii, of polylactic acid;
iii) from 10 to 50% by weight, based on the total weight of components i to iv, of at least one mineral filler; and
iv) from 0 to 2% by weight, based on the total weight of components i to iv, of a nutrient salt mixture comprising at least two components selected from the group consisting of: nitrogen-containing cation or anion, sulfur-containing anion, phosphorus-containing anion, and cation selected from the group consisting of $K^+$, $Na^+$, $Ca^{2+}$, $Mg^{2+}$, and $Fe^{2/3+}$, has optimized mechanical properties, optimized heat distortion resistance, and optimized biodegradation performance.

Components i to iii are in particular responsible for the interesting property profile of the item. Component i guarantees high heat resistance together with good biodegradability, component ii provides the necessary rigidity and moreover improves biodegradability through a supplementary degradation mechanism. The mineral filler iii) improves mechanical properties, such as modulus of elasticity, and heat distortion resistance, and in particular in the case of chalk, promotes biodegradability.

A more detailed description of the invention appears below.

The aliphatic polyesters i suitable for the invention have been described in more detail in WO 2010/034711, which is expressly incorporated herein by way of reference.

Polyesters i are generally composed of the following:
a) from 90 to 99.5 mol %, based on components a to b, of succinic acid;
b) from 0.5 to 10 mol %, based on components a to b, of one or more $C_8$-$C_{20}$ dicarboxylic acids;
c) from 98 to 102 mol %, based on components a to b, of 1,3-propanediol or 1,4-butanediol; and
d) from 0.05 to 1% by weight, based on the total weight of components a to c, of a chain extender or branching agent.

The copolyesters described are preferably synthesized in a direct polycondensation reaction of the individual components. The dicarboxylic acid derivatives here are reacted together with the diol in the presence of a transesterification catalyst directly to give the high-molecular-weight polycondensate. On the other hand, it is also possible to obtain the polyester via transesterification of polybutylene succinate (PBS) with $C_8$-$C_{20}$ dicarboxylic acids in the presence of diol. Catalysts used usually comprise zinc catalysts, aluminum catalysts, and in particular titanium catalysts. An advantage of titanium catalysts, such as tetra(isopropyl) orthotitanate and in particular tetraisobutoxy titanate (TBOT) over the tin catalysts, antimony catalysts, cobalt catalysts, and lead catalysts often used in the literature, for example tin dioctanoate, is that any residual amounts of the catalyst or downstream product from the catalyst that remain within the product are less toxic. This is a particularly important factor in biodegradable polyesters because they pass into the environment by way of example in the form of composting bags or mulch films.

A mixture of the dicarboxylic acids is generally first heated in the presence of an excess of diol together with the catalyst to an internal temperature of from 170 to 230° C. within a period of about 60-180 min, and resultant water is removed by distillation. The melt of the resultant prepolyester is then usually condensed at an internal temperature of from 200 to 250° C. within the period of from 3 to 6 hours at reduced pressure while the diol liberated is removed by distillation until the desired viscosity has been achieved with intrinsic viscosity (IV) from 100 to 450 mL/g and preferably from 120 to 250 mL/g.

The copolymers of the invention can also be produced by the processes described in WO 96/15173 and EP-A 488 617. It has proven advantageous to begin by reacting components a to c to give a prepolyester with IV from 50 to 100 mL/g, preferably from 60 to 80 mL/g, and then to react this with chain extenders d, for example with diisocyanates or with epoxy-containing polymethacrylates, in a chain extension reaction to give a polyester with IV from 100 to 450 mL/g, preferably from 120 to 250 mL/g.

Acid component a used comprises from 90 to 99.5 mol %, based on acid components a and b, preferably from 91 to 99 mol %, and with particular preference from 92 to 98 mol %, of succinic acid. Succinic acid is accessible by a petrochemical route, or else preferably from renewable raw materials, for example as described in PCT/EP2008/006714. PCT/EP2008/006714 discloses a biotechnological process for producing succinic acid and 1,4-butanediol starting from various carbohydrates and using microorganisms from the Pasteurellaceae family.

The amount used of acid component b is from 0.5 to 10 mol %, preferably from 1 to 9 mol %, and with particular preference from 2 to 8 mol %, based on acid components a and b.

The expression $C_8$-$C_{20}$ dicarboxylic acids b in particular means terephthalic acid, suberic acid, azelaic acid, sebacic acid, brassylic acid and/or arachidonic acid. Preference is given to suberic acid, azelaic acid, sebacic acid and/or brassylic acid. The abovementioned acids, inclusive of terephthalic acid, are accessible from renewable raw materials. By way of example, sebacic acid is accessible from castor oil. Polyesters of this type feature excellent biodegradation performance [reference: *Polym. Degr. Stab.* 2004, 85, 855-863].

The dicarboxylic acids a and b can be used either in the form of free acid or in the form of ester-forming derivatives. Particular ester-forming derivatives that may be mentioned are the di-$C_1$- to $C_6$-alkyl ester, such as dimethyl, diethyl, di-n-propyl, diisopropyl, di-n-butyl, diisobutyl, di-tert-butyl, di-n-pentyl, diisopentyl, or di-n-hexyl ester. Anhydrides of the dicarboxylic acids can also be used.

The dicarboxylic acids or ester-forming derivatives thereof can be used individually or in the form of a mixture here.

The diols 1,3-propanediol and 1,4-butanediol are also accessible from renewable raw materials. It is also possible to use a mixture of the two diols. 1,4-Butanediol is preferred as diol because of the higher melting points and the better crystallization of the resultant copolymer.

At the start of the polymerization reaction, the ratio of the diol (component c) to the acids (components a and b) is generally adjusted so that the ratio of diol to diacids is from 1.0 to 2.5:1 and preferably from 1.3 to 2.2:1. Excess amounts of diol are drawn off during the polymerization reaction so that the ratio obtained at the end of the polymerization reaction is approximately equimolar. The expression approximately equimolar means a diol/diacids ratio of from 0.90 to 1.10.

Use is generally made of from 0.05 to 1% by weight, preferably from 0.1 to 0.9% by weight, and with particular preference from 0.1 to 0.8% by weight, based on the total weight of components a to b, of a crosslinking agent d and/or chain extender d' selected from the group consisting of: a polyfunctional isocyanate, isocyanurate, oxazoline, carboxylic anhydride, such as maleic anhydride, epoxide (in particular an epoxy-containing poly(meth)acrylate), an at least trihydric alcohol, or an at least one tribasic carboxylic acid. Chain extenders d' used can comprise polyfunctional, and in particular difunctional, isocyanates, isocyanurates, oxazolines, or epoxides.

Chain extenders and alcohols or carboxylic acid derivatives having at least three functional groups can also be considered to be crosslinking agents. Particularly preferred compounds have from three to six functional groups. Examples that may be mentioned are: tartaric acid, citric acid, malic acid, trimesic acid, trimellitic acid, trimellitic anhydride, pyromellitic acid, and pyromellitic dianhydride; trimethylolpropane, trimethylolethane; pentaerythritol, polyethertriols, and glycerol. Preference is given to polyols, such as trimethylolpropane, pentaerythritol, and in particular glycerol. By using components d it is possible to construct pseudoplastic biodegradable polyesters. The rheological behavior of the melts improves; the biodegradable polyesters have better processability, for example better drawability to give films via melt solidification. The compounds d have a shear-thinning effect, i.e. they make the polymer more pseudoplastic. Viscosity decreases under load.

It is generally advisable to add the crosslinking (at least trifunctional) compounds to the polymerization reaction at a relatively early juncture.

Examples of suitable bifunctional chain extenders are tolylene 2,4-diisocyanate, tolylene 2,6-diisocyanate, diphenylmethane 2,2'-diisocyanate, diphenylmethane 2,4'-diisocyanate, diphenylmethane 4,4'-diisocyanate, naphthylene 1,5-diisocyanate, and xylylene diisocyanate, hexamethylene 1,6-diisocyanate, isophorone diisocyanate, and methylenebis(4-isocyanatocyclohexane). Particular preference is given to isophorone diisocyanate and in particular hexamethylene 1,6-diisocyanate.

The number-average molar mass (Mn) of the polyesters i is generally in the range from 5000 to 100 000 g/mol, in particular in the range from 10 000 to 75 000 g/mol, preferably in the range from 15 000 to 50 000 g/mol, and their weight-average molar mass (Mw) is generally from 30 000 to 300 000 g/mol, preferably from 60 000 to 200 000 g/mol, and their Mw/Mn ratio is generally from 1 to 6, preferably from 2 to 4. Intrinsic viscosities from 30 to 450 g/mL, preferably from 50 to 400 g/mL (measured in o-dichlorobenzene/phenol (ratio by weight 50/50)). Melting point is in the range from 85 to 130, preferably in the range from 95 to 120° C.

The rigid component ii is polylactic acid (PLA).

It is preferable to use polylactic acid with the following property profile:
- a melt volume rate (MVR for 190° C. and 2.16 kg to ISO 1133 of from 0.5 to 15 ml/10 minutes, in particular from 1 to 10 ml/10 minutes)
- melting point below 240° C.;
- glass transition temperature (Tg) above 55° C.
- water content smaller than 1000 ppm
- residual monomer content (lactide) smaller than 0.3%
- molecular weight greater than 80 000 daltons.

Examples of preferred polylactic acids are NatureWorks® 6201 D, 6202 D, 6251 D, 3051 D, and in particular 4020 D or 4043 D, and also crystalline polylactic acids from NatureWorks.

The percentage proportion by weight used of the polylactic acid ii, based on components i and ii, is from 15 to 50%, preferably from 15 to 45%, and with particular preference from 20 to 40%. It is preferable here that the polylactic acid ii forms the dispersed phase and that the polyester i forms the continuous phase or is part of a co-continuous phase. Polymer mixtures with polyester i in the continuous phase or as part of a co-continuous phase have higher heat distortion resistance than polymer mixtures in which polylactic acid ii forms the continuous phase.

The amount used of at least one mineral filler selected from the group consisting of: chalk, graphite, gypsum, conductive carbon black, iron oxide, calcium chloride, dolomite, kaolin, silicon dioxide (quartz), sodium carbonate, titanium dioxide, silicate, wollastonite, mica, montmorillonites, talc powder, and mineral fibers is generally from 10 to 50% by weight, in particular from 10 to 40%, and particularly preferably from 10 to 35%, based on the total weight of components i to iv.

Talc powder and chalk are particularly preferred as fillers. Interestingly, it has been found that addition of chalk can achieve a further improvement in the biodegradability of the items. Talc powder in turn can provide greater effectiveness in terms of increasing modulus of elasticity and improving heat distortion resistance.

Mixtures of talc powder and chalk have proven particularly advantageous. A mixing ratio that has proven advantageous here is from 1:5 to 5:1, preferably from 1:3 to 3:1, and in particular from 1:2 to 1:1.

For the purposes of the present invention, a substance or substance mixture complies with the "biodegradable" feature if the percentage degree of biodegradation of said substance or the substance mixture to DIN EN 13432 is at least 90% after 180 days.

Biodegradbility generally leads to decomposition of the polyesters or polyester mixtures in an appropriate and demonstrable period of time. The degradation can take place by an enzymatic, hydrolytic, or oxidative route, and/or via exposure to electromagnetic radiation, such as UV radiation, and can mostly be brought about predominantly via exposure to microorganisms, such as bacteria, yeasts, fungi, and algae. Biodegradability can be quantified by way of example by mixing polyester with compost and storing it for a particular period. By way of example, in DIN EN 13432 (with reference to ISO 14855), $CO_2$-free air is passed through ripened compost during the composting process, and the compost is subjected to a defined temperature profile. Biodegradability here is defined as a percentage degree of biodegradation, by taking the ratio of the net amount of $CO_2$ released from the specimen (after subtraction of the amount of $CO_2$ released by the compost without specimen) to the maximum amount of $CO_2$ that can be released from the specimen (calculated from the carbon content of the specimen). Biodegradable polyesters or biodegradable polyester mixtures generally exhibit clear signs of degradation after just a few days of composting, examples being fungal growth, cracking, and perforation.

Other methods of determining biodegradability are described by way of example in ASTM D5338 and ASTM D6400-4.

Thermoforming is a forming process for thermoplastics.

The semifinished product is introduced in a form which depends on the type of plant: sheet or roll of film. The films and sheets are usually produced by a single-screw extruder leading to a slot die and 3-roll polishing stack.

Items made of films (typically from 50 μm to 1 mm) are widely used, examples being chocolate-box inserts, packaging for chocolate-covered marshmallows, games-box inserts, folding blister packs for a very wide variety of small items displayed on adjustable racking in retail outlets, and yogurt pots and margarine tubs. Other products of this type are slider card blisters, sealed covers, and the difficult-to-open folding blister packs in which small parts are often marketed, and which are welded by means of high-frequency electrodes.

Sheets of thickness from 1 to 2 mm are processed for sorting trays, transport trays, KLT (small container) inserts, or simple engineering parts.

Particularly suitable materials for thermoforming are polymer mixtures of components i to iv with MVR (190° C., 2.16 kg) to ISO 1133 of 1, preferably from 1 to 15 cm³/10 min, with particular preference from 4 to 15 cm³/10 min. Other materials that have proven suitable in these polymer mixtures are in particular polyesters i which comprise from 0.05 to 1% by weight, preferably from 0.01 to 0.9% by weight, and with particular preference from 0.1 to 0.8% by weight, based on components a to c, of a branching agent. Polyols, such as pentaerythritol or glycerol, have proven to be particularly suitable branching agents.

Performance Tests:

The molecular weights Mn and Mw of the semiaromatic polyesters were determined by means of SEC to DIN 55672-1: eluent hexafluoroisopropanol (HFIP)+0.05% by weight of potassium trifluoroacetate; narrowly distributed polymethyl methacrylate standards were used for calibration.

Intrinsic viscosities were determined to DIN 53728 part 3, Jan. 3, 1985, Capillary viscometry. An M-II micro-Ubbelohde viscometer was used. The solvent used comprised a phenol/o-dichlorobenzene mixture in a ratio by weight of 50/50.

Modulus of elasticity was determined by means of a tensile test on pressed films of thickness about 420 μm to ISO 527-3: 2003.

Charpy impact resistance was determined to ISO 179-2/1eU:1997. The test specimen (80 mm×10 mm×4 mm) in the form of a horizontal bar supported close to its ends is subjected to a single pendulum impact, the impact line being in the middle between the two test-specimen supports, and a high, nominally constant bending velocity (2.9 or 3.8 m/s) is used (on the specimen).

HDT-B heat distortion resistance was determined to ISO 75-2:2004. A standard test specimen is subjected to three-point bending under constant load, thus producing a flexural stress (HDT/B 0.45 MPa) as stated in the relevant part of said international standard. The temperature is increased at uniform rate (120 K/h), and the temperature value measured is that at which a defined standard deflection is achieved, corresponding to the defined increase in flexural strain (0.2%).

The degradation rates of the biodegradable polyester mixtures and of the mixtures produced for comparison were determined as follows:

Films were produced from the biodegradable polyester mixtures and from the mixtures produced for comparison, in each case via pressing at 190° C. and with thickness of 400 μm. In each case, these foils were cut into rectangular pieces with edge lengths of 2×5 cm. The weight of said film pieces was determined. The film pieces were heated to 58° C. in an oven in a plastics container containing moistened compost, for a period of four weeks. At weekly intervals the residual weight of each piece of film was measured. On the assumption that biodegradation can be considered in these instances to be purely a surface process, the gradient of the resultant weight reduction (biodegradation rate) was determined by calculating the difference between the weight measured after taking of a sample and the mass of the film before the start of the test, less the average total weight reduction that occurred up to the taking of the preceding specimen. The mass reduction obtained was also standardized for surface area (in cm²) and also for time between taking of current and previous specimen (in d).

The degradation rates determined were based on the degradation rate of PBS (=100%).

Starting Materials

Polyester i:

a) Polybutylene succinate

First, butanediol (93.7 g, 130 mol %), succinic acid (94.5 g, 100 mol %), and 0.2 g of glycerol (0.1% by weight) were heated to 200° C. in the presence of tetrabutyl orthotitanate TBOT (0.2 g), and the resultant water was removed by distillation during a period of 30 min. This prepolyester was then reacted at reduced pressure (<5 mbar) to give the high-molecular-weight polyester. For this, 1,4-butanediol was removed by distillation up to a temperature of 250° C. The IV of the resultant polyester was 171 mL/g.

b) Polybutylene succinate-co-suberate (succinic acid:suberic acid=90:10)

Butanediol (85.0 g, 130 mol %), succinic acid (77.1 g, 90 mol %), and suberic acid (12.6 g, 10 mol %), and 0.18 g of glycerol (0.1% by weight) were first heated to 200° C. in the presence of TBOT (0.2 g). The melt was kept at this temperature during a period of 80 min. 1,4-Butanediol was then removed by distillation at reduced pressure (<5 mbar) and at a maximum internal temperature of 250° C. The polyester was decanted and analyzed after cooling. The intrinsic viscosity of the resultant polyester was 170 mL/g.

c) Polybutylene succinate-co-sebacate (succinic acid:sebacic acid=95:5)

Butanediol (89.0 g, 130 mol %), succinic acid (85.3 g, 95 mol %), and sebacic acid (7.7 g, 5 mol %), and 0.14 g of glycerol (0.1% by weight) were first heated to 200° C. in the presence of TBOT (0.2 g). The melt was kept at this temperature during a period of 80 min. 1,4-Butanediol was then removed by distillation at reduced pressure (<5 mbar) and at a maximum internal temperature of 250° C. The polyester was decanted and analyzed after cooling. The intrinsic viscosity of the resultant polyester was 227 mL/g and the MVR thereof was 7.57 cm$^3$/10 min.

d) Polybutylene succinate-co-sebacate (succinic acid:sebacic acid=90:10)

Butanediol (87.5 g, 130 mol %), succinic acid (79.4 g, 90 mol %), and sebacic acid (15.1 g, 10 mol %), and 0.19 g of glycerol (0.1% by weight) were first heated to 200° C. in the presence of TBOT (0.2 g). The melt was kept at this temperature during a period of 80 min. 1,4-Butanediol was then removed by distillation at reduced pressure (<5 mbar) and at a maximum internal temperature of 250° C. The polyester was decanted and analyzed after cooling. The intrinsic viscosity of the resultant polyester was 252 mL/g.

e) Polybutylene succinate-co-azelate (succinic acid:azelaic acid=90:10)

Butanediol (92.0 g, 130 mol %), succinic acid (83.4 g, 90 mol %), and azelaic acid (14.8 g, 10 mol %), and 0.19 g of glycerol (0.1% by weight) were first heated to 200° C. in the presence of TBOT (0.2 g). The melt was kept at this temperature during a period of 80 min. 1,4-Butanediol was then removed by distillation at reduced pressure (<5 mbar) and at a maximum internal temperature of 250° C. The polyester was decanted and analyzed after cooling. The intrinsic viscosity of the resultant polyester was 214 mL/g.

f) Polybutylene succinate-co-brassylate (succinic acid:brassylic acid=90:10)

Butanediol (85 g, 130 mol %), succinic acid (77.1 g, 90 mol %), and brassylic acid (18.1 g, 10 mol %), and 0.17 g of glycerol (0.1% by weight) were first heated to 200° C. in the presence of TBOT (0.2 g). The melt was kept at this temperature during a period of 80 min. 1,4-Butanediol was then removed by distillation at reduced pressure (<5 mbar) and at a maximum internal temperature of 250° C. The polyester was decanted and analyzed after cooling. The intrinsic viscosity of the resultant polyester was 160 mL/g.

g) Polybutylene succinate-co-terephthalate (succinic acid: terephthalic acid=90:10)

Butanediol (90.8 g, 130 mol %), succinic acid (82.4 g, 90 mol %), and dimethyl terephthalate (15.0 g, 10 mol %), and 0.18 g of glycerol (0.1% by weight) were first heated to 200° C. in the presence of TBOT (0.2 g). The melt was kept at this temperature during a period of 80 min. 1,4-Butanediol was then removed by distillation at reduced pressure (<5 mbar) and at a maximum internal temperature of 250° C. The polyester was decanted and analyzed after cooling. The intrinsic viscosity of the resultant polyester was 172 mL/g.

h) Polybutylene succinate (GreenPLA PBS) from Mitsubishi; MVR is 4.5 cm$^3$/10 min (190° C., 2.16 kg)

i) Comparative Substance Bionolle® 1020 PBS from Showa Highpolymer; MVR is from 20 to 34 cm$^3$/10 min (190° C., 2.16 kg)

To determine biodegradability, a molding press was used to produce films of thickness about 420 μm.

TABLE 1

Biodegradation rate measured on the basis of mass loss from a molding, standardized for the surface area of the molding. Relative to PBS (= 100%):

| Example | Material | Rel. degradation rate (standardized mass loss) [%] |
|---|---|---|
| a | PBS | 100 |
| b | PBSSub 10% | 450 |
| c | PBSSe 5% | 300 |
| d | PBSSe 10% | 700 |
| e | PBSAz 10% | 850 |
| f | PBSBry 10% | 1000 |
| g | PBST 10% | 260 |

Polylactic acid ii-1: 4043D from NatureWorks, MVR being 2.5 cm$^3$/10 min (190° C., 2.16 kg)

Mineral Fillers
iii-1: chalk from Omya, Omyafilm 764-OM
iii 1: talc powder from Mondominerals, Microtalc IT extra

EXAMPLES

I) Production of Polymer Mixtures (GS1)

The compounded materials listed in table 2 were manufactured in a Coperion ZSB 40 extruder. The discharge temperatures were set to 250° C. The extrudate was then pelletized under water. After pelletization, a flat film of thickness 1.2 mm was produced. Processing temperatures here were set to a melt temperature of 190° C.

TABLE 2

Compounded materials produced via GS1; data in percent by weight

| Compounded material | Polyester i) i-c) | Polyester i) i-h) | Polyester i) i-i) | PLA ii-1) | Chalk iii-1) | Talc powder iii-2) |
|---|---|---|---|---|---|---|
| 1 | 49 | | | 21 | 15 | 15 |
| 2 | | 49 | | 21 | 15 | 15 |
| Comp-3 | | | 49 | 21 | 15 | 15 |

II) Production of Thermoformed Parts

A semiautomatic Illig UA100/4 thermoforming machine was used here. The heating power of 27.4 kW was generated via a lower and an upper ceramic source. The forming process used vacuum. A wooden cup mold with a basal diameter of 67.0 mm, a height of 72.0 mm, and an upper diameter of 55.0 mm was used for the experiments. The radius of the edge of the cup was about 8.0 mm.

Inventive Example 1

With compounded materials 1 and 2 it was easily possible to produce flat films of thickness 1.2 mm. Subsequent heating under the quartz sources was achieved without difficulty, as also was the forming process to give the cup geometry. Summary: Compounded materials 1 and 2 of the invention are suitable for the thermoforming of this cup geometry.

Comparative Example 2

Compounded material Comp-3 was used in an attempt to carry out the experimental sequence (flat film production, heating and thermoforming with vacuum assistance). Flat film production was equally possible with Comp-3. Differences were observed in heating behavior: whereas no significant sag of the heated film was observed for compounded materials 1 and 2, and no other problems were observed during the heating process, local sag was observed with the film of compounded material Comp-3. When (purely visually) the material reached the softening point the film completely lost the required stability and tore (perforation).

Each of the experiments was repeated at least 5 times. The results described were reproducible.

The invention claimed is:

1. An article produced via thermoforming and comprising:
   i) from 50 to 85% by weight, based on the total weight of components i to ii, of a biodegradable polyester with MVR (190° C., 2.16 kg) of from 1 to 15 cm$^3$/10 min and comprising:
   a) from 90 to 100 mol %, based on components a) to b), of succinic acid;
   b) from 0 to 10 mol %, based on components a) to b), of sebacic acid;
   c) from 98 to 102 mol %, based on components a) to b), of 1,3-propanediol or 1,4-butanediol;
   d) from 0.05 to 1% by weight, based on components a) to c), of a chain extender or branching agent;
   from 15 to 50% by weight, based on the total weight of components i) to ii), of polylactic acid;
   iii) from 10 to 50% by weight, based on the total weight of components i) to iv), of at least one mineral filler, wherein said mineral filler is a mixture of talc powder and chalk in a ratio of from 1:5 to 5:1;
   iv) from 0 to 2% by weight, based on the total weight of components i) to iv), of a nutrient salt mixture comprising at least two components selected from the group consisting of: nitrogen-containing cation or anion, sulfur-containing anion, phosphorus-containing anion, and cation selected from the group consisting of K$^+$, Na$^+$, Ca$^{2+}$, Mg$^{2+}$, and Fe$^{2/3+}$.

2. The article according to claim 1, wherein component b) in polyester i is from 0.5 to 10 mol % of sebacic acid.

3. The article according to claim 1, wherein said polyester i) forms the continuous phase or part of a co-continuous phase.

4. The article according to claim 1 with a wall thickness of from 50 μm to 2 mm.

5. The article according to claim 1 with a modulus of elasticity to ISO 527-3 of from 1200 to 4500 MPa and with an HDT-B temperature to ISO 75-2 of from 60 to 115° C.

* * * * *